US006351318B1

(12) United States Patent
Gunning et al.

(10) Patent No.: US 6,351,318 B1
(45) Date of Patent: Feb. 26, 2002

(54) USE OF A PRINTER FRAME BUFFER TO HOLD IMAGE DATA RECEIVED FROM A SOURCE DEVICE WHICH CANNOT BE PACED

(75) Inventors: Chris R. Gunning, Boise; Scott D. Bonar, Meridian, both of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/181,065

(22) Filed: Oct. 27, 1998

(51) Int. Cl.[7] .............................................. G06K 15/00
(52) U.S. Cl. ...................................... 358/1.16; 358/1.1
(58) Field of Search ........................ 358/1.1, 1.9, 1.16, 358/1.17, 296, 300, 404, 406, 437, 468, 444, 449, 451, 401

(56) References Cited

U.S. PATENT DOCUMENTS

| 5,303,341 A | 4/1994 | Rivshin | 395/162 |
|---|---|---|---|
| 5,754,750 A | 5/1998 | Butterfield et al. | 395/118 |
| 5,801,720 A | 9/1998 | Norrod et al. | 345/526 |
| 5,821,977 A | 10/1998 | Nishimura | 347/234 |

FOREIGN PATENT DOCUMENTS

| DE | 19939886 A | 5/2000 |
|---|---|---|
| EP | 0715449 A1 | 6/1996 |
| FR | 2784934 A | 4/2000 |
| GB | 2345604 A | 7/2000 |
| GB | 2345813 A | 7/2000 |

Primary Examiner—Arthur G. Evans

(57) ABSTRACT

An image data transfer mechanism is disclosed having a source device, processing circuitry, and a target device. The source device is operative to transmit digital data. The processing circuitry is coupled to the source device for receiving the image data from the source device. The target device has memory, and is coupled with the processing circuitry. The target device is operative to receive the image data, while the memory is allocatable as a frame buffer for receiving the image data. A method is also disclosed.

20 Claims, 4 Drawing Sheets

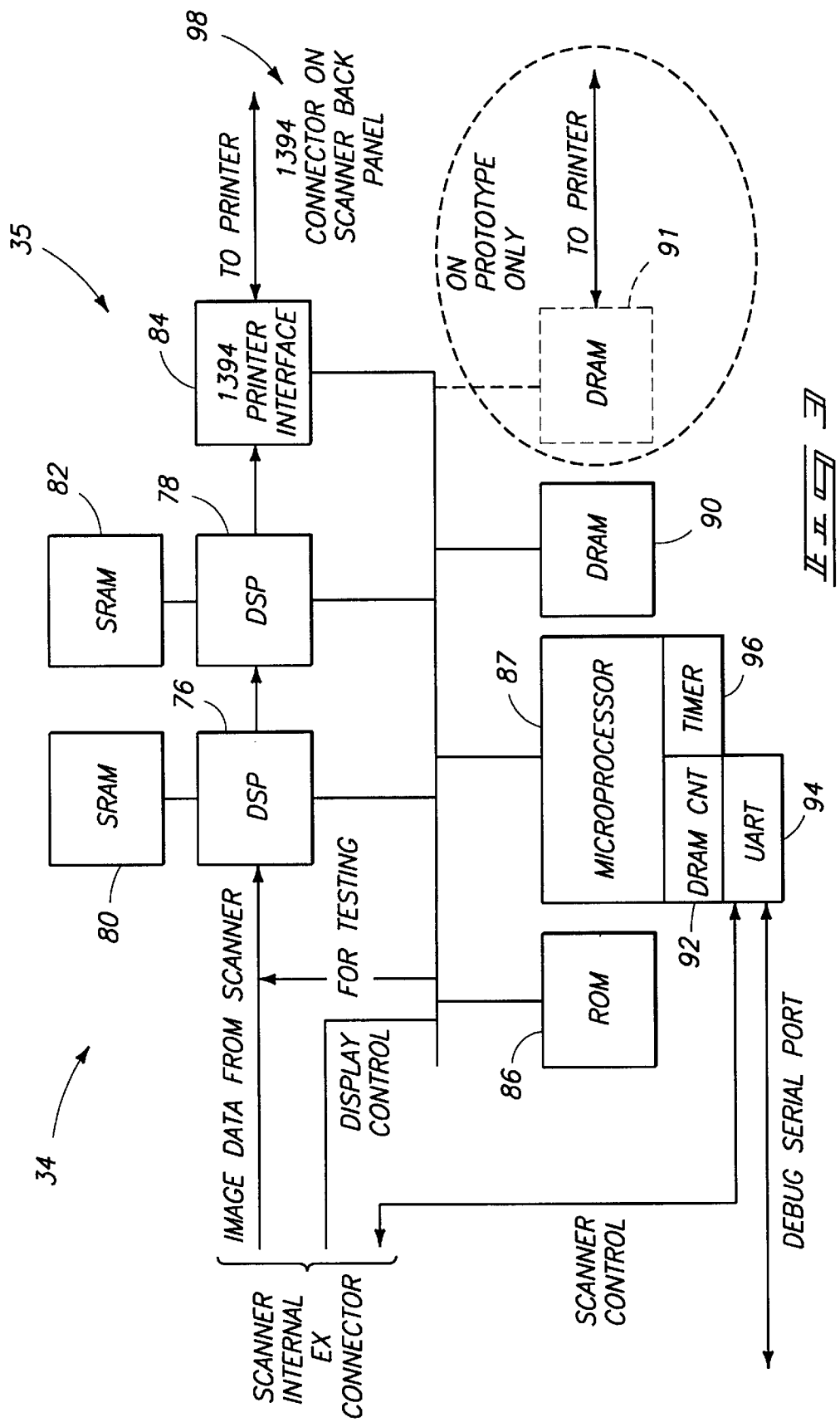

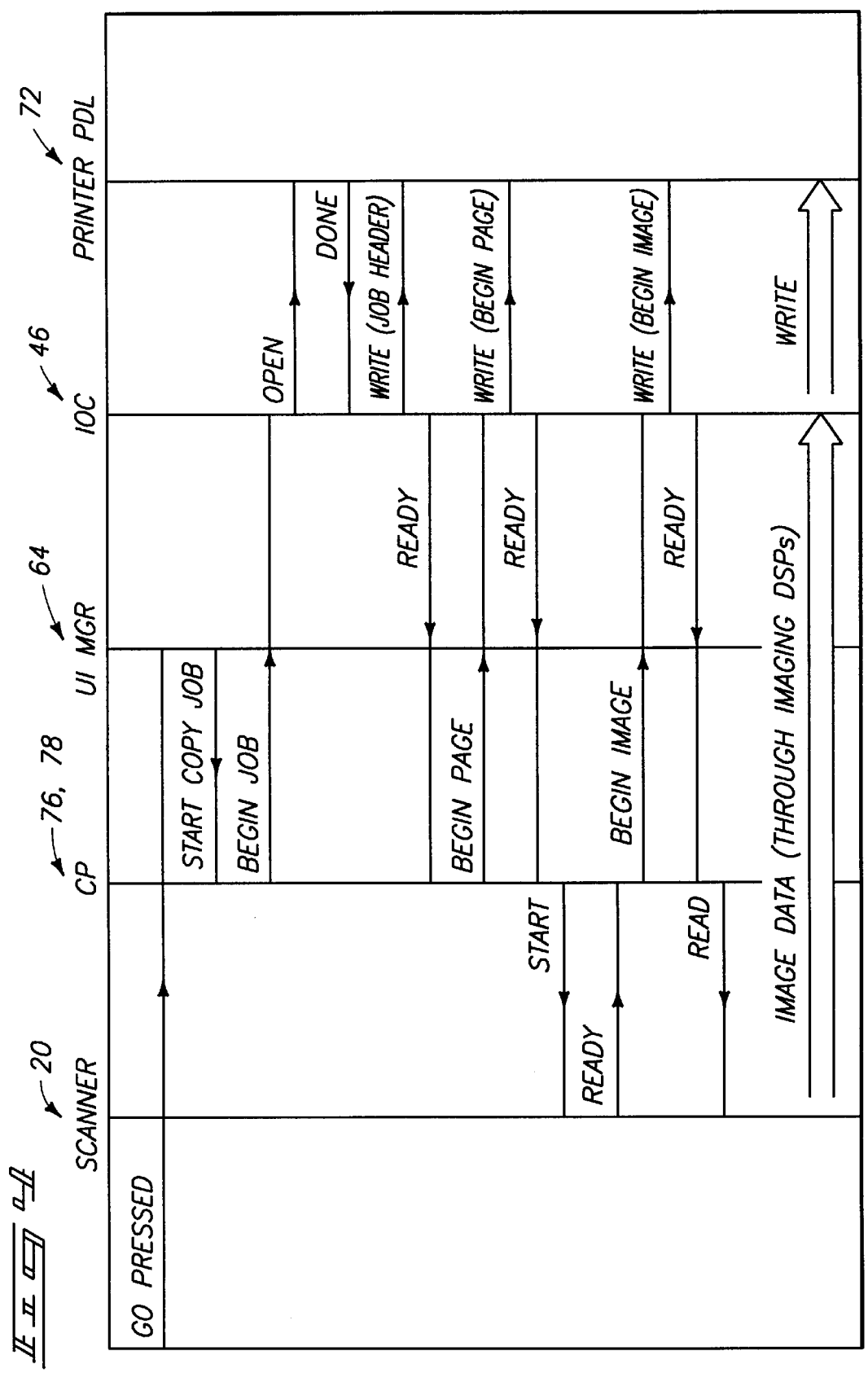

USE OF A PRINTER FRAME BUFFER TO HOLD IMAGE DATA RECEIVED FROM A SOURCE DEVICE WHICH CANNOT BE PACED

FIELD OF THE INVENTION

This invention relates generally to data transfer between a source device and a target device and, more particularly, to an image data transfer mechanism between a source device incapable of generating image data that is paced and a target device that receives the image data via memory that is allocated as a frame buffer.

BACKGROUND OF THE INVENTION

Prior art solutions have existed for transferring digital images from a source device to a target device. For example, prior art scanners are oftentimes coupled with a printer so as to form a copy machine. Once the scanner begins scanning data from a document, processing circuitry should be able to receive the entire page of image data at the speed with which it is scanned via the scanner. Accordingly, a significant amount of memory is required for such implementations. Additionally, a typical scanner does not contain a buffer, and furthermore the scanner cannot be paced in order to slow down the amount of image data that is transferred to the printer. For example, the amount of image data from one page of a document can be up to 45 megabytes, for an 11-inch by 17-inch page that is scanned at 8 bits per pixel, 400 dots per inch by 600 dots per inch. Hence, the memory requirements are significant.

In order to deliver copy devices to small business and home user environments, there is a need to minimize the amount of memory required by a target device, such as a printer, such that the product can remain cost-competitive. In fact, substantial efforts have recently been directed to reducing the amount of required memory in laser printers specifically to enhance performance while at the same time improving cost-effectiveness and size.

Prior art techniques that attempt to reduce the amount of memory required between a source device and a target device all involve compromises which affect performance. For the case where a printer and a copier are coupled together via a copy processor card and an IEEE 1394 interface, a card slot is provided for receiving a copy processor card which forms a serial bus interconnecting the scanner and printer. Such scanner and printer form a copier. In order to maintain competitive costs, no buffer is provided on the scanner. Accordingly, the source device, or scanner, must be paced in order to limit the amount of image data delivered at speed to the printer. For this example, one of several solutions need to be implemented to overcome data transfer problems.

According to one solution, the scanner is provided with a start-stop mechanism. A controller on the scanner is provided for scanning part of a document page, with the controller stopping until a receiver is ready to receive more data, then continuing when the receiver is ready. However, many scanners are not provided with this capability. For those scanners that are provided with such capability, there exist scan quality issues, such as banding, which result from the start-stop capability.

According to another solution, a scanner is provided with a frame buffer. The provision of a frame buffer results in particular disadvantages in that this form of memory is dedicated to a single purpose and cannot be used for any other purpose. Accordingly, additional memory is required for imparting additional functionality, which increases cost and complexity.

Yet another solution comprises providing a frame buffer for a copy processor card. However, this implementation has the same disadvantage discussed above, in that the memory is dedicated for a single purpose. Therefore, additional memory is required for addressing additional purposes. There exists a further additional disadvantage in that a trade-off must be made due to space constraints in the card between the amount of memory that can be placed on the copy processor card, and the number of imaging copy processors, or digital signal processing chips, that can be provided on the card in order to pace data at the source device. More particularly, it is a disadvantage in that such implementation requires a source copy processor card. Alternatively, this implementation requires the provision of such copy processors being placed directly on the scanner mechanism itself.

Yet another solution includes providing a frame buffer on the input/output (I/O) card of the printer. Such implementation has the same above-mentioned disadvantage in that the memory is dedicated to a single purpose.

This invention relates to improvements for transferring image data from a source device to a target device to more efficiently, compactly, and cost effectively transfer such images, particularly as it relates to use with multiple function machines.

SUMMARY OF THE INVENTION

This invention solves the problem of receiving image data when flow control cannot be performed between a source device such as a scanner and a target device such as a printer.

According to one aspect of the invention, an image data transfer mechanism is disclosed having a source device, processing circuitry, and a target device. The source device is operative to transmit digital data. The processing circuitry is coupled to the source device for receiving the image data from the source device. The target device has memory, and is coupled with the processing circuitry. The target device is operative to receive the image data, while the memory is allocatable as a frame buffer for receiving the image data.

According to another aspect of the invention, an image data transfer mechanism is disclosed which includes a scanner, circuitry, an input/output controller, and a printer. The scanner is operative to capture image data. The circuitry is configured to deliver the image data at a rate corresponding substantially with the rate with which the image data is captured. The input/output controller is coupled with the circuitry and is configured to receive and process the image data substantially at the rate with which the image data is delivered. The printer has allocatable memory operative to receive the delivered image data.

According to yet another aspect of the invention, a method is disclosed for transferring image data from a source device to a target device wherein the source device cannot be paced, comprising: generating a digital image in the form of image data with a source device; providing a target device having allocatable memory; allocating a frame buffer in the memory for receiving the image data; and transferring the image data from the source device to the frame buffer of the target device.

Objects, features and advantages are to provide an apparatus and method for transferring image data between a source device and a target device in a manner that is relatively accurate, efficient, cost-effective and competitive, economical and smaller in size and weight.

DESCRIPTION OF THE DRAWINGS

Preferred embodiments of the invention are described below with reference to the following accompanying drawings depicting examples embodying the best mode for practicing the invention.

FIG. 3 is a functional block diagram illustrating in greater detail the hardware components associated with the copy processor card of FIG. 2.

FIG. 4 is a communications flow diagram depicting communications occurring between a source device, copy processors, a user interface manager, an I/O controller, and a data sink.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

In illustrating an embodiment of the present invention, a multiple function machine is shown with scanning and print capabilities that cooperatively form a copy machine. The copy machine enables a walk-up copier user to scan and submit image data to the machine such that the image data is processed and sent from the scanner to the printer. However, it is understood that such multiple-function machine can involve other types of source devices and target devices for transferring image data in a manner that is reliable, of relatively low cost and small in size, and utilizes a reduced amount of memory.

Figure 1:
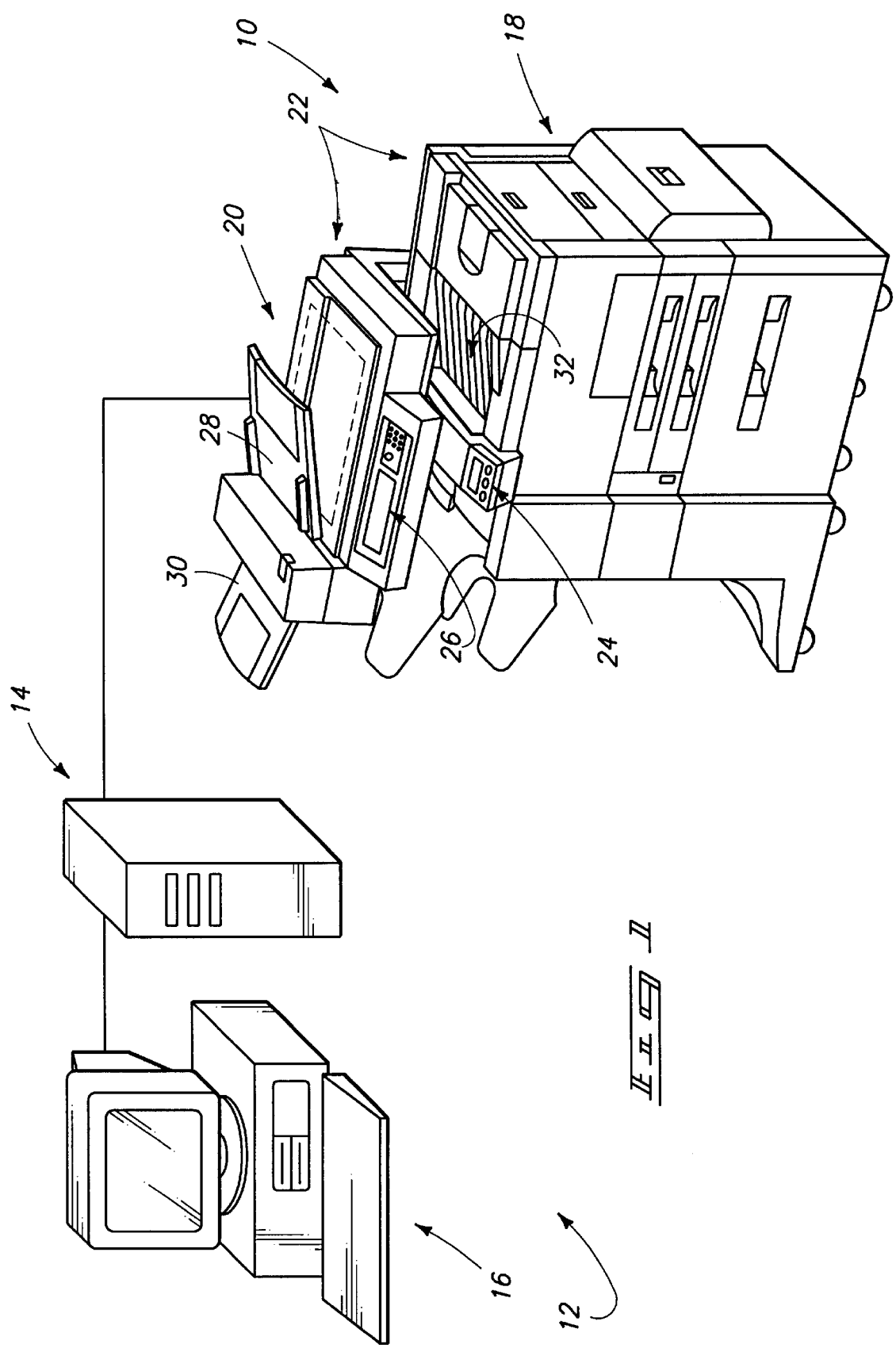
FIG. 1 is a perspective view of one image data transfer mechanism embodied with features of this invention and implemented within a network environment as a source device in the form of a scanner and a target device in the form of a printer.

A preferred embodiment of the invention is illustrated in the accompanying drawings particularly showing an image data transfer mechanism for transferring image data from a source device to a target device generally designated with reference numeral 10 in FIG. 1. Image data transfer mechanism 10 is generally implemented as a multi-function machine, in one embodiment a network copy machine. Network copy machine 10 is provided within a network environment 12. As such, network copy machine 10 is connected to a network server 14 from which any of a number of users are able to submit print jobs via one or more host computers 16 to machine 10. As shown in FIG. 1 for illustration purposes, host computer 16 comprises a personal computer (PC), and server 14 is signal coupled with copy machine 10. Computer 16, server 14, and copy machine 10 are all coupled together via network lines.

As shown in FIG. 1, copy machine 10 includes an output device in the form of a printer 18 and an input device in the form of a scanner 20 that cooperate to provide a copier 22. A printer user interface 24 is provided on printer 18 having a keypad and display screen. Similarly, a copier user interface 26 is provided on scanner 20 which serves to enable a walk-up user to configure copy characteristics of copier 22. For example, paper size can be selected via user interface 24. Additionally, or optionally, a printed image can be lightened/ darkened and/or enlarged/reduced. Copier user interface 26 also includes a keypad and a display screen. Scanner 20 further includes a scanner infeed tray 28 for receiving documents to be copied, and a scanner outfeed tray 30 for collecting documents that have already been scanned. Similarly, printer 18 includes a printer outfeed tray 32 where print output is collected in hard copy form.

Figure 2:
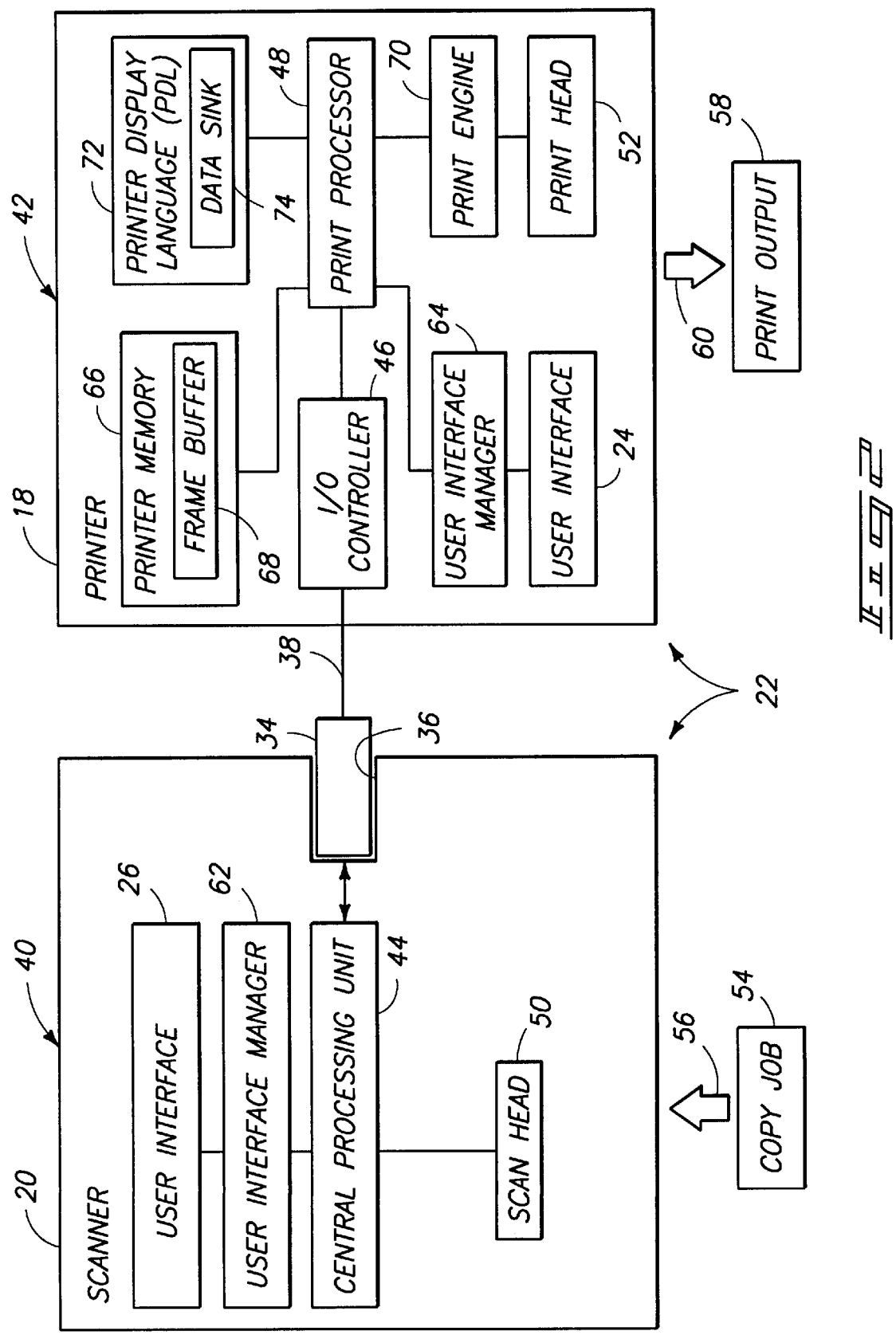
FIG. 2 is a functional block diagram of a presently preferred embodiment of the invention illustrating a system for transferring image data between a source device and a target device for receiving a copy job and generating a print output.

FIG. 2 illustrates in functional block diagram form one presently preferred embodiment of the invention depicted in FIG. 1, and illustrating a system for more efficiently transferring image data from a source device to a target device. More particularly, scanner 20 and printer 18 are shown coupled together by a copy processor card 34 received in a card slot 36, and a serial bus 38. One suitable form for serial bus 38 is provided by an IEEE-1394 bus. A corresponding IEEE-1394 interface (not shown) is used to attach bus 38 to printer 18. An opposite end of bus 38 terminates in a copy processor (CP) card 34. Copy processor card 34 installs into a slot 36 provided in scanner 20. Copy processor card 34 performs image processing and manages copier user interface (UI) 26. In operation, copy processor card 34 cooperates with slot 36 to provide a communication mechanism between printer 18 and scanner 20 of copier 22.

As shown in FIGS. 1 and 2, scanner 20 depicts one particular embodiment for a source device 40, and printer 18 depicts one particular embodiment for a target device 42. However, it is understood that the image data transfer mechanism of this invention can be implemented with any of a number of different source devices 40 and target devices 42. For example, source device 40 can be a digital camera, and target device 42 can be a facsimile machine.

FIG. 2 depicts pertinent components of scanner 20 and printer 18 of copier 22 used in implementing Applicant's invention. Scanner 20 includes user interface 26 which is coupled to a central processing unit (CPU) 44 via a user interface manager 62. A scan head 50 is also coupled to CPU 44. According to one construction, scan head 50 comprises an optical/electronic image sensor capable of detecting and digitizing images such as a particular copy job 54 presented as a scan request 56 by a user (not shown).

Printer 18 includes an input/output (I/O) controller 46 that connects with serial bus 38. A print processor 48 is coupled with I/O controller 46. Such print processor serves as a main processor for printer 18. Accordingly, a printer memory 66, user interface 24, a printer display language (PDL) 72 and a print engine 70 are each coupled with print processor 48. In the case of user interface 24, a user interface manager 64 is interposed between user interface 24 and print processor 48. Similarly, print engine 70 is interposed between a print head 52 and print processor 48. According to one construction, print head 52 comprises a laser print head with imaging optics and a photoconductor drum.

Also according to FIG. 2, printer memory 66 includes a frame buffer 68 comprising random access memory (RAM) such as SRAM 80 and 82 (of FIG. 3). Such RAM is resident on printer 18 where it is allocated as frame buffer 68. Printer display language (PDL) 72 includes data sink 74. Ultimately, data sink 74 receives the transferred image data.

In operation, printer 18 receives image data via serial bus 38 from a copy job 54 captured as a digital image via scanner 20. Such image is efficiently transferred to memory 66 via the techniques and apparatus of Applicant's invention as discussed in further detail below. Such image data is received by data sink 74, and can also be delivered as print output 58 via a print job 60 from print head 52. Such print output 58 is collected in printer outfeed tray 32 (of FIG. 1).

According to the construction depicted in FIG. 2, this invention consists of a source device 40 which generates image data that cannot be paced, such as scanner 20 described above. An intermediate processor of image data, which also cannot be paced, is provided within copy processor card 34 in the form of a pair of copy processors 76 and 78 (described below with reference to FIG. 3). Printer 18 receives image data through copy processor card 34 via serial bus 38. Printer memory 66, in the form of RAM, can be allocated as frame buffer 68 as needed in order to receive such transferred image data.

Input/output (I/O) hardware is provided in the form of serial bus 38. More particularly, serial bus 38 comprises an IEEE-1394 I/O card which is capable of delivering a suitable bandwidth required in order to receive the image data. I/O device driver firmware is also provided in the form of input/output (I/O) controller 46 which is capable of processing image data at the rate it is received from scanner 20. An input/output (I/O) client application can also be provided in order to manage the allocation and deallocation of frame buffer 68 as needed.

Printer display language (PDL) 72 receives and renders an image from frame buffer 68. Printer memory 66 may be allocated statically or dynamically. For example, where it is static, the allocation occurs at printer initialization. Where it is dynamic, the allocation occurs just before a page is scanned. However, there is no requirement that the allocation be made in contiguous memory.

For the case where copy processor card 34 is operated in IEEE-1394 isochronous mode, the bandwidth of communications is guaranteed. However, the delivery of communications is not guaranteed. If delivery is not realizable for some reason, such delivery is lost. For example, delivery can be lost if the target didn't have enough memory to receive all the data from the source. For the case where reliable delivery is a requirement, such delivery can be done in higher levels of the communications protocol. However, for the implementation depicted in FIGS. 1–4, this will require rescanning of the source page, since data is not buffered at source 40.

According to one planed commercial implementation of Applicant's invention, image data transfer mechanism 10 comprises a network copy machine consisting of a 32 page-per-minute (ppm) wide-format printer engine 70 and a 32 inch-per-minute (ipm) wide-format duplex scanner 20. Scanner 18 comprises a digital imaging device that includes copy processor card 34 (see FIG. 2) which converts 8 bits-per-page (bpp) image data from scanner 20 into 2 bit-per-page (bpp) or 1 bit-per-page (bpp) half-toned raster data for printer 18. Card 34 is installed into slot 36 in scanner 20, and attaches to printer 18 using an IEEE-1394 interface (not shown).

Copy processor card 34 can control when scanner 20 begins to scan an input page. However, once the scanner mechanism of scanner 20 begins the scan, card 34 must be able to receive the entire page of image data at speed because there is no buffer on scanner 20, and scanner 20 cannot be paced. The amount of image data for one page can be up to 45 megabytes (MB), for a typical 11 inch×17 inch page that is scanned at 8 bits-per-page (bpp), at 400 dots-per-inch (dpi)×600 dots-per-inch (dpi).

Card 34 is sized to fit into slot 36 in scanner 20. However, card 34 is designed to fit within a specific package size which has limited power availability and size constraints. If enough RAM were placed on card 34 to receive the image data being transferred, then there would not be enough power and room left on the card for a pair of imaging digital signal processors (DSPs) (copy processors 76 and 78 of FIG. 3) which are needed to process the image data at 32 pages-per-minute (ppm). In fact, there would be only enough room for one imaging DSP, which by itself would only be able to process 16–20 pages-per-minute (ppm).

FIG. 3 illustrates in greater detail a functional block diagram depicting the hardware components associated with copy processor card 34 (of FIG. 2). More particularly, copy processor card 34 includes a processor board (not shown) containing processing circuitry 35 including a pair of copy processors 76 and 78. Additionally, ROM memory 86, a microprocessor 87, DRAM memory 90 and 91 and a printer interface 84 are mounted on such board. According to one construction, copy processors 76 and 78 each comprise an imaging digital signal processor (DSP) such as a PM-44 copy processor comprising an imaging Digital Signal Processor (DSP) sold by Pixel Magic and usable for controls imaging. Each copy processor 76 is provided with a dedicate memory in the form of SRAM 80 and 82, respectively.

Microprocessor 87 is associated with a DRAM controller 92, a UART 94 and a timer 96. DRAM controller 92 is operative to control usage of DRAM 90 and 91. UART 94 comprises a universal asynchronous receiver transmitter, or an electronic circuit that transmits and receives data on serial port 38 (see FIG. 2). Timer 96 generates electrical pulses in order to synchronize computer operations. Furthermore, an IEEE 1394 connector 98 is provided on a back panel of scanner 20 (see FIG. 2) for connecting copy processor card 34 with printer 18.

FIG. 4 illustrates a communications flow diagram for the device of FIGS. 1–3. In operation, communication occurs between a source device of image data, such as scanner 20, and a data sink 74 of a target device 42, such as printer 18 (of FIG. 2). Interposed between the source device and target device is an intermediate processor of image data, such as copy processors 76 and 78 (of FIG. 3), a user interface (UI) manager 64 and an input/output (I/O) controller 46. User interface manager 64 initiates the process of sending image data from source device 40 to image device 42 (of FIG. 2). I/O controller, or its client, tells the image data source device or intermediate processor when the printer frame buffer 68 is ready. For purposes of this discussion, the I/O controller 46 as described includes the client. Data sink 74, such as printer PDL 72, ultimately receives the image data.

FIG. 4 illustrates a communications flow diagram depicting communications occurring between source device 40 (printer 20), copy processors 76 and 78), user interface (UI) manager 64, I/O controller 46, and data sink 74 as shown above in FIGS. 2–3. For purposes of discussing FIG. 4, copy processor (CP) is understood to include both copy processors 76 and 78 shown in FIG. 3 and associated circuitry provided on the copy processor card.

More particularly, the process begins when a user initiates a scan request. In FIG. 4, this is indicated by the "Go pressed" event, which is an external event that in this example is sent directly to the UI manager 64 (of FIG. 2). The user interface may be located on the scanner, copy processor, printer, or external to all three. For example, user interface 24 of FIG. 2 provides one such location.

The UI manager 64 (of FIG. 2) then sends a "Start Copy Job" request to the copy processor (CP) 76 and 78 (see all of FIG. 3), or scanner if there is not a separate copy processor (CP). This request may contain job attributes such as expected paper size, scale factors, clipping regions, and copy quality modes.

The copy processor (CP) sends a "Begin Job" message to the input/output (IOC) controller 46 (see FIG. 2). This request may contain printer-specific job attributes from the "Start Copy Job" request, such as number of copies, output resolution, and finishing (e.g., stapling) options. The copy processor (CP) may have already established a channel to the input/output controller (IOC), or it may do so at this time. The input/output controller (IOC) opens a channel to the printer display language (PDL) 72 (of FIG. 2). The input/output controller (IOC) receives a "Done" response when the PDL job channel is opened. The input/output controller (IOC) then sends the job attributes to the PDL in a job header. As shown in FIG. 4, the input/output controller (IOC) also sends a "Ready" response back to the copy processor (CP), although this is not necessary when implementing Applicant's invention.

Next, the copy processor (CP) 76 and 78 send a "BeginPage" message to IOC 46. There is one "BeginPage" message sent per output page. There may be multiple source pages per output page, such as for N-up printing where N indicates the number of separate images printed to a common page. This request may contain printer-specific output page attributes, such as desired paper size, input tray, and destination bin. IOC 46 then forwards that request to the PDL 72. As shown in FIG. 4, IOC 46 also sends a "Ready" response back to copy processor (CP) 76 and 78, although once again this is not necessary when implementing Applicant's invention.

Next, copy processor (CP) 76 and 78 send a "Start" request to the scanner. This tells the scanner to prepare to do a scan, but not perform the scan yet. For example, the scanner may pull the first page forward in the automatic document feeder (ADF) 28 (see FIG. 1). The "Start" request may actually be sent anytime after the copy processor (CP) 76 and 78 receive the "StartCopyJob" request, and it may be done in parallel with the requests sent from the copy processors (CP) to the IOC 46.

Next, the copy processor (CP) 76 and 78 send a "BeginImage" request to IOC 46. This message contains size, pixel depth, and placement information about the image. Based on this data, IOC 46 knows how much RAM is required to receive the image data. If IOC 46 has not already allocated a frame buffer, it will do so dynamically at this time. If IOC 46 already allocated a frame buffer, for example, at printer initialization, IOC 46 will determine whether enough of it is currently available to satisfy the current "BeginImage" request. Note that part or all of the frame buffer may still be in use from a previous "BeginImage" request. If not enough memory is available, IOC 46 will wait until the memory is available, as previous work completes.

Once enough memory is available, IOC 46 will send a "Ready" response back to copy processor (CP) 76 and 78. IOC 46 will also turn some or all of the memory over to the I/O hardware, so when the hardware receives the image data it can write it directly into the frame buffer. The memory is passed to the hardware as a list of blocks. This is so the frame buffer does not have to be in contiguous physical memory, nor does it have to be managed as a single unit.

When copy processor (CP) 76 and 78 receives the "Ready" response to the "BeginImage" request, it will send a "Read" request to the scanner. At this point the scanner will begin scanning the page and send image data to copy processor (CP) 76 and 78 at scan speed. Copy processor (CP) 76 and 78 may do scaling, filtering, halftoning, and other processing on the data. A window of several dozen lines of scan data may be buffered on copy processor (CP) 76 and 78 to facilitate this processing. Since copy processor (CP) 76 and 78 does not have a frame buffer, however, this processing must keep up with the scanner.

Copy processor (CP) 76 and 78 sends the processed data to the printer in parallel with the scan. The I/O hardware receives the data and writes it to the memory blocks given to it by IOC 46. As it fills individual blocks, the hardware notifies IOC 46 that the data is available. Ownership of the block is then returned to IOC 46. IOC 46 then passes the data to PDL 42. Typically this is by passing a pointer to the block, not by copying the data to separate memory. PDL 42 will eventually notify IOC 46 when it is done with each block. At that time, the block can be used for a future "BeginImage" request or it can be returned to the printer memory pool for other use.

The process of sending "BeginImage" requests, replies, and image data repeats for as many source pages as appear on the output page (typically one, but more for N-up). The process of sending "BeginPage" messages is repeated for each output page in the job. Eventually the job will complete, copy processor (CP) 76 and 78 will send an "EndJob" message, and IOC 46 will finish the job with PDL 72. PDL 72 will finish consuming the image data and return the remaining blocks to IOC 46.

In summary, one advantage of this invention is provided in that the memory for the frame buffer is on the printer, where it can be used for other purposes when it is not being used as a frame buffer. A secondary benefit is that less total memory is required in the entire system comprised of the printer and the source device. No space or power is required for frame buffer memory on the source or intermediate devices, allowing that space and power to be used for other things.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An image data transfer mechanism, comprising:
    a source device operative to transmit digital image data;
    a copy processor card including a copy processor having processing circuitry coupled to the source device for receiving the image data from the source device;
    a target device having memory, the target device coupled with the processing circuitry and operative to receive the image data, the memory allocatable as a frame buffer for receiving the image data;
    a serial bus communicating with the copy processor card and provided between the source device and the target device; and
    a card slot provided by one of the source device and the target device and configured to removably receive the copy processor card;
    wherein the copy processor card cooperates with the card slot to provide a communication mechanism between the source device and the target device.

2. The image data transfer mechanism of claim 1 wherein the target device comprises an output device for receiving print ready image data.

3. The image data transfer mechanism of claim 1 wherein the source device comprises a digital scanner.

4. The image data transfer mechanism of claim 3 wherein the processing circuitry comprises a digital signal processor, the digital signal processor configured to receive scanned digital image data from the digital scanner.

5. The image data transfer mechanism of claim 1 wherein the card slot is provided on the source device and the copy processor card is connected with the target device via the bus.

6. The image data transfer mechanism of claim 5 wherein the bus comprises an IEEE-1394 serial bus including and IEEE-1392 I/O card, the copy processor card comprises a pair of copy processors, and further comprising an I/O controller provided on the target device having I/O device driver firmware capable of processing image data substantially at a rate that it is received from the source device.

7. The image data transfer mechanism of claim 6 wherein at least one of the copy processors is incapable of being paced.

8. The image data transfer mechanism of claim 1 wherein the target device memory comprises random access memory (RAM).

9. The image data transfer mechanism of claim 8 wherein the frame buffer comprises a portion of the memory usable to hold a frame of the image data.

10. The image data transfer mechanism of claim 1 further comprising a user interface manager provided by the target device interposed between a user interface and a print processor of the target device, configured to provide an intermediate processor of image data, and operative to initiate a process of sending image data from the source device to the target device.

11. The image data transfer mechanism of claim 10 further comprising an I/O controller provided by the target device and configured to notify the source device when a printer frame buffer of the target device is ready to receive image data.

12. An image data transfer mechanism, comprising:
- a scanner operative to capture image data;
- a copy processor card comprising circuitry configured to deliver the image data at a rate corresponding substantially with the rate with which the image data is captured;
- a card slot configured to receive the copy processor card;
- an input/output controller coupled with the circuitry and configured to receive and process the image data substantially at the rate with which the image data is delivered;
- a printer having allocatable memory operative to receive the delivered image data;
- wherein the copy processor card is provided on one of the scanner and the printer, and the card slot is provided on another of the scanner and the printer, and the copy processor card is configured to send processed data to the printer in parallel with scan.

13. The image data transfer mechanism of claim 12 wherein the circuitry comprises input/output hardware including an IEEE-1394 bus operable in isochronous mode.

14. The image data transfer mechanism of claim 12 further comprising a printer display language (PDL) associated with the printer and operative to receive and render an image from the image data being delivered to the allocatable memory.

15. The image data transfer mechanism of claim 14 wherein the printer display language (PDL) comprises a data sink operative to receive the delivered image data.

16. A method for transferring image data from a source device to a target device wherein the source device cannot be paced, comprising the steps of:
- generating a digital image in the form of image data with a source device;
- providing a target device having allocatable memory;
- allocating a frame buffer in the memory for receiving the image data; and
- concurrent with generating the digital image, transferring the image data from the source device to the frame buffer of the target device.

17. The method of claim 16 wherein the image data is transferred via a serial bus operating in isochronous mode.

18. The method of claim 16 further including the step of processing the image data at substantially the same rate the image data is received by the target device.

19. The method of claim 16 further including the step of managing allocation/deallocation of the frame buffer while transferring the image data.

20. The method of claim 16 further including the steps of receiving and rendering an image from the image data transferred to the frame buffer.

* * * * *